(12) United States Patent
Wilbanks

(10) Patent No.: US 7,832,140 B2
(45) Date of Patent: *Nov. 16, 2010

(54) ATTRACTING MOSQUITOES FOR ELECTROCUTION AND/OR TRAPPING

(76) Inventor: Alvin D. Wilbanks, 12288-A Dereks Way, Holts Summit, MO (US) 65043

( * ) Notice: Subject to any disclaimer, the term of this patent is extended or adjusted under 35 U.S.C. 154(b) by 995 days.

This patent is subject to a terminal disclaimer.

(21) Appl. No.: 10/445,584

(22) Filed: May 27, 2003

(65) Prior Publication Data

US 2003/0192229 A1 Oct. 16, 2003

Related U.S. Application Data

(63) Continuation of application No. 09/009,122, filed on Jan. 20, 1998, now Pat. No. 6,568,124, which is a continuation-in-part of application No. 08/761,282, filed on Dec. 6, 1996, now Pat. No. 6,050,025, which is a continuation-in-part of application No. 08/395,910, filed on Feb. 28, 1995, now Pat. No. 5,595,018.

(51) Int. Cl.
*A01M 1/22* (2006.01)
(52) U.S. Cl. .............................. 43/112; 43/139; 43/113
(58) Field of Classification Search .................. 43/112, 43/113, 139
See application file for complete search history.

(56) References Cited

U.S. PATENT DOCUMENTS

| | | | |
|---|---|---|---|
| 1,337,560 A | 4/1920 | Kohn | |
| 1,583,975 A | 5/1926 | Hunt | |
| 1,807,076 A | 5/1931 | Sweet | |
| 2,013,969 A | 9/1935 | Menasche | |
| 2,567,616 A | 9/1951 | Moore | |
| 3,041,773 A | 7/1962 | Gagliano | |
| 3,058,257 A | 10/1962 | Brophy | |
| 3,123,933 A | 3/1964 | Roche | |
| 3,196,577 A | 7/1965 | Plunkett | |
| 3,201,893 A | 8/1965 | Gesmar | |
| 3,319,374 A | 5/1967 | Gawne | |
| 3,796,001 A | 3/1974 | Jackson | |
| 4,127,961 A | 12/1978 | Phillips | |
| 4,141,173 A * | 2/1979 | Weimert et al. | 43/113 |
| 4,182,069 A | 1/1980 | DeYoreo | |
| 4,442,624 A * | 4/1984 | Browne | 43/107 |
| 4,454,677 A | 6/1984 | Chuang | |
| 4,523,404 A | 6/1985 | DeYoreo | |
| 4,696,126 A | 9/1987 | Grothaus et al. | |
| 4,852,296 A | 8/1989 | Swanson et al. | |
| 4,891,904 A | 1/1990 | Tabita | |
| 4,907,366 A | 3/1990 | Balfour | |

(Continued)

*Primary Examiner*—Christopher P Ellis
(74) *Attorney, Agent, or Firm*—Michael J. Colitz, Jr.

(57) ABSTRACT

An insect killing system optimized for mosquitoes uses multiple thermal gradients to simulate the breathing of, and body heat emitted by, animals, including human beings and fowl, to attract insects for subsequent electrocution and/or trapping. Mosquitoes are attracted to a mosquito-killing device for electrocution and/or trapping. Heat is generated within the device such that a heat gradient between an outer surface of the device and the atmosphere surrounding the device is created thereby emulating emission of body heat by an animal. At least one mosquito attractant, such as an aromatic, a pheromone, or moisture, is emitted from the device. And an airflow is created that sucks mosquitoes, which have been attracted to the outside of the device, into the device for electrocution and/or trapping by the device.

36 Claims, 9 Drawing Sheets

U.S. PATENT DOCUMENTS

| | | |
|---|---|---|
| 4,908,978 A | 3/1990 | Zacharias |
| 5,020,270 A | 6/1991 | Lo |
| 5,205,064 A | 4/1993 | Nolen |
| 5,241,779 A | 9/1993 | Lee |
| 5,255,468 A * | 10/1993 | Cheshire, Jr. .............. 43/113 |
| 5,301,458 A * | 4/1994 | Deyoreo et al. .............. 43/139 |
| 5,595,018 A | 1/1997 | Wilbanks |
| 5,647,164 A * | 7/1997 | Yates .......................... 43/139 |
| 5,657,576 A | 8/1997 | Nicosia |
| 5,669,176 A | 9/1997 | Miller |
| 5,749,168 A * | 5/1998 | Chrysanthis .............. 43/122 |
| 5,799,436 A | 9/1998 | Nolen et al. |
| 5,813,166 A | 9/1998 | Wigton et al. |
| 6,050,025 A | 4/2000 | Wilbanks |
| 6,088,949 A | 7/2000 | Nicosia et al. |
| 6,145,243 A | 11/2000 | Wigton et al. |
| 6,199,316 B1 | 3/2001 | Coventry |
| 6,286,249 B1 | 9/2001 | Miller et al. |
| 6,305,122 B1 | 10/2001 | Iwao et al. |
| 6,530,172 B2 | 3/2003 | Lenz |

* cited by examiner

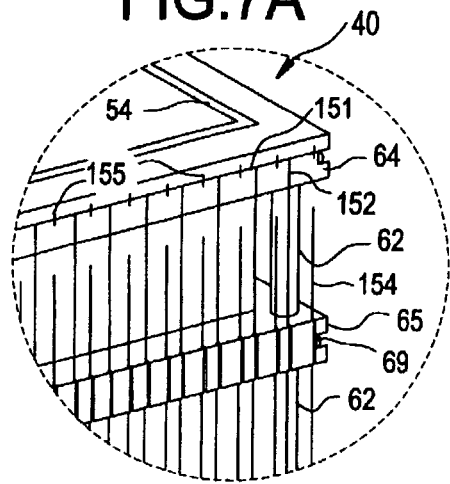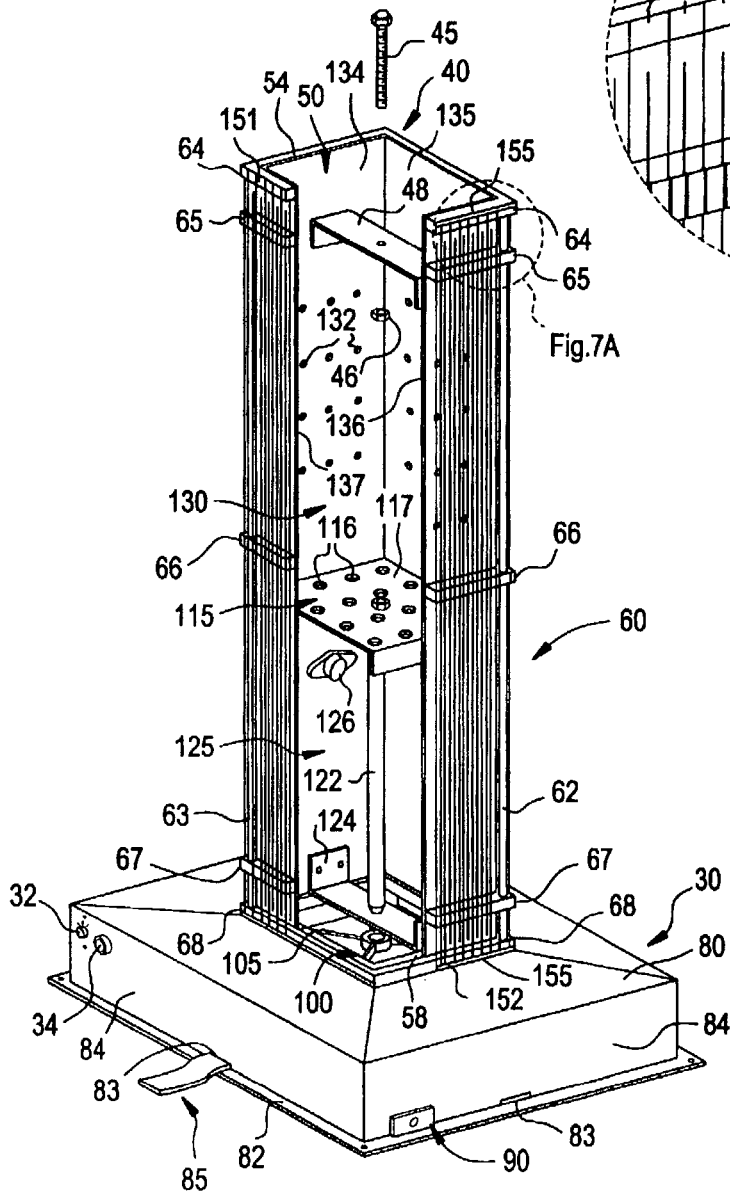

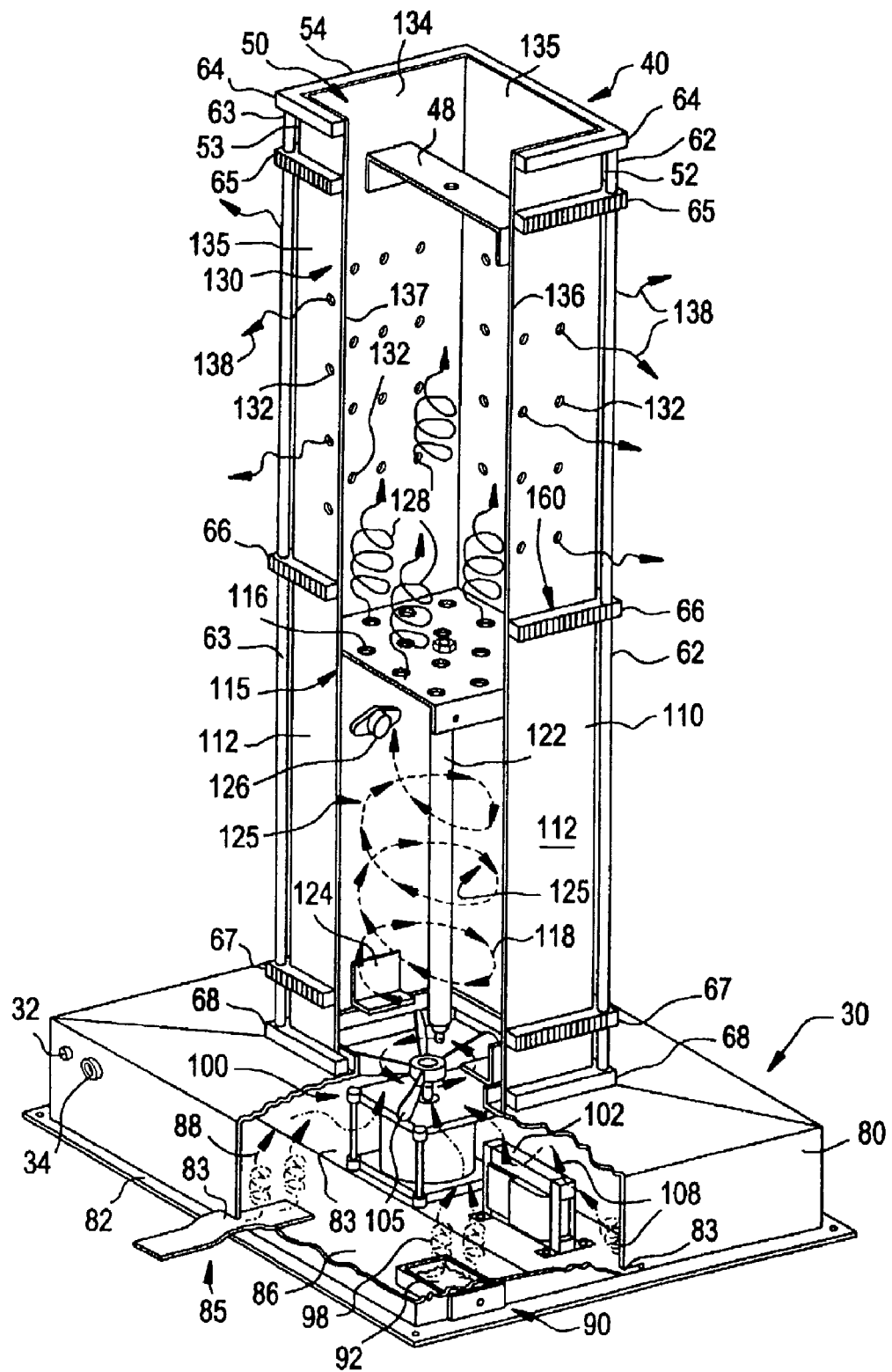

ATTRACTING MOSQUITOES FOR ELECTROCUTION AND/OR TRAPPING

This is a continuation of pending application Ser. No. 09/009,122, filed Jan. 20, 1998, which is a continuation-in-part of application Ser. No. 08/761,282, filed Dec. 6, 1996, now U.S. Pat. No. 6,050,025, which is a continuation-in-part of application Ser. No. 08/395,910, filed Feb. 28, 1995, now U.S. Pat. No. 5,595,018.

TECHNICAL FIELD

The invention relates generally to attracting and exterminating harmful insects, in particular mosquitoes, and in particular relates to emulating certain characteristics of a mammal to attract insects for electrocution and/or trapping.

BACKGROUND OF THE INVENTION

Insect killing devices are known in the art, see e.g. U.S. Pat. Nos. 5,255,468, 4,852,296, 4,891,904, 5,205,064, 5,020,270, 4,696,126 and 5,301,458.

The conventional insect killing devices heretofore known typically use light to attract insects to an electrocution grid. Aforementioned U.S. Pat. No. 4,891,904 to Tabita discloses a heating device for heating a liquid insecticide containing carrier, such as a mat or wick, for evaporating the insecticide into the atmosphere.

The known prior art devices are largely ineffective for killing mosquitoes, blood-sucking insects notorious for carrying and spreading diseases such as malaria and yellow fever, while such devices attract and kill many harmless or environmentally beneficial species of insects. A side effect of such systems is that they are prone to eventual failure as a result of clogging of the voltage grid by the remains of larger insects, which can lead to short circuits, inability of the grid to electrocute additional insects, and other failures. Systems such as disclosed in the '904 patent which release toxic poisons into the air clearly are undesirable.

There remains a need in the art for effectively attracting and exterminating mosquitoes, while being environmentally safe and minimizing attraction of other beneficial insects.

SUMMARY OF THE INVENTION

The invention is directed to solving the problems discussed above. An illustrative embodiment of the invention is directed to a method of attracting mosquitoes to a mosquito-killing device for electrocution and/or trapping. The method comprises: generating heat within the device such that a heat gradient between an outer surface of the device and the atmosphere surrounding the device is created thereby emulating emission of body heat by an animal; emitting at least one mosquito attractant from the device; and creating an airflow that sucks mosquitoes, which have been attracted to the outside of the device, into the device for electrocution and/or trapping by the device. The attractant may be an aromatic, a pheromone, or moisture. Generating heat within the device may comprise: using resistive electrical conductors to generate the heat. The airflow may be directed through an electrocution grid and/or a trap within the device.

Another illustrative embodiment of the invention is directed to a method of attracting mosquitoes to a mosquito-killing and/or trapping apparatus. The method comprises: emitting heat from an outer surface of the apparatus to create a heat gradient for attracting mosquitoes to the outer surface of the apparatus; simulating exhaling by an animal by emitting a gaseous flow for attracting mosquitoes to the apparatus; and creating an airflow to suck the attracted mosquitoes into the apparatus for electrocution and/or trapping by the apparatus. The gaseous flow may include: a pheromone, or moisture. Resistive electrical conductors may be used to generate heat within the apparatus. The airflow may be directed through an electrocution grid within the device.

Another illustrative embodiment of the invention is directed to an apparatus that attracts mosquitoes to be killed and/or trapped. The apparatus comprises: means for generating heat within the apparatus such that a heat gradient between an outer surface of the apparatus and the atmosphere surrounding the apparatus is created thereby emulating emission of body heat by an animal; means for emitting at least one mosquito attractant from the apparatus; and means for creating an airflow that sucks mosquitoes, which have been attracted to the outside of the apparatus, into the apparatus for electrocution and/or trapping within the apparatus. The means for generating heat within the apparatus may include means for using resistive electrical conductors to generate the heat. The apparatus may further comprise: means for directing the airflow through an electrocution grid or trap within the apparatus.

BRIEF DESCRIPTION OF THE DRAWINGS

The invention disclosed herein will be better understood with reference to the following drawings, of which:

FIG. 7 is a partially fragmented isometric view similar to FIG. 2, with portions omitted for illustrative purposes;

FIG. 8 is a partially fragmented isometric view similar to FIG. 7, with portions omitted for illustrative purposes;

DETAILED DESCRIPTION OF THE INVENTION

Figure 1:
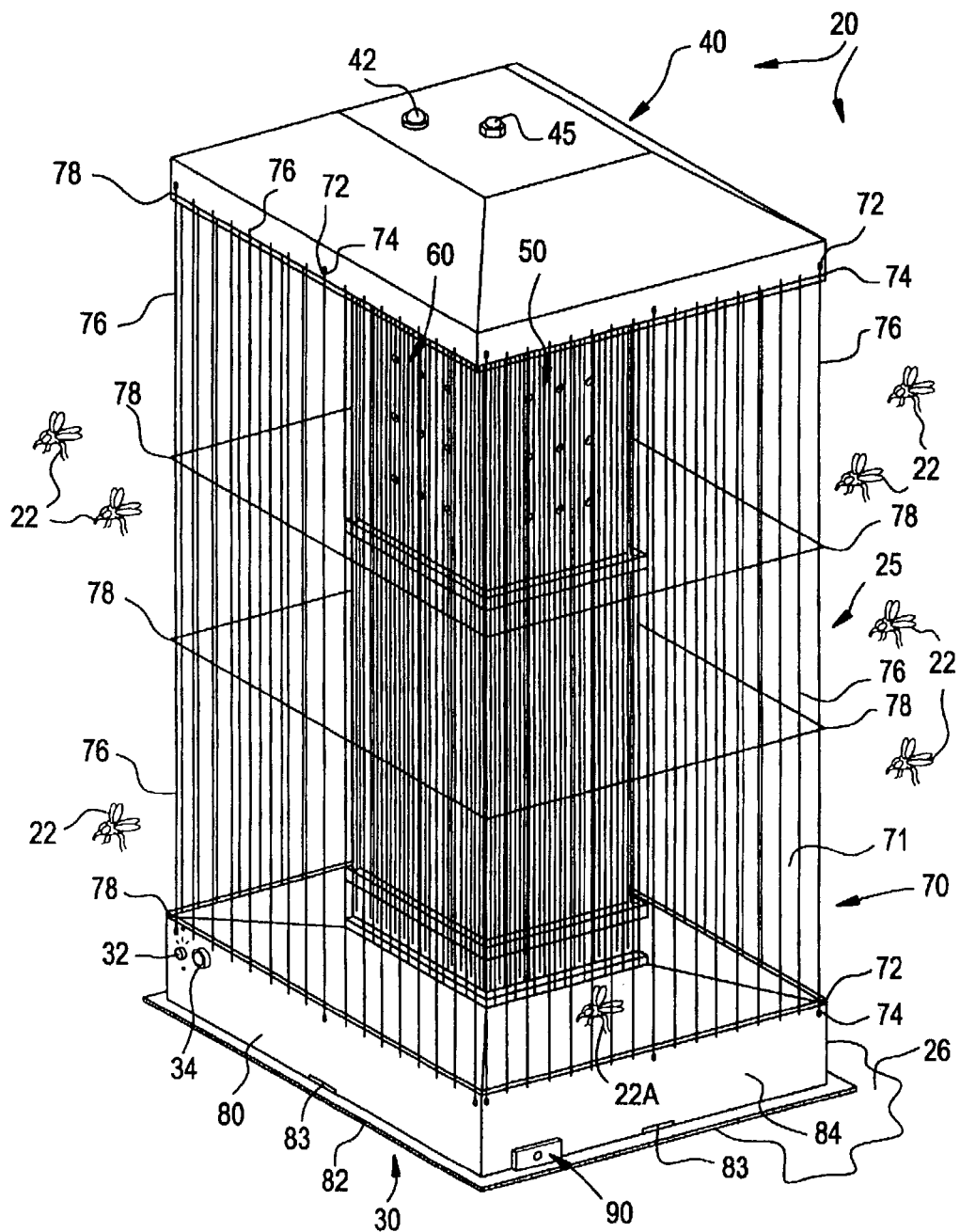
FIG. 1 is an isometric view of a mosquito killing apparatus according to an embodiment of the invention.

Referring more specially to the drawings, my improved mosquito killing system is generally designated by reference numeral 20. System 20 attracts mosquitoes 22 by actively projecting multiple infrared heat gradients and pressure differentials coupled with a wide variety of aromatics that simulate animal body heat and breathing.

Figure 2:
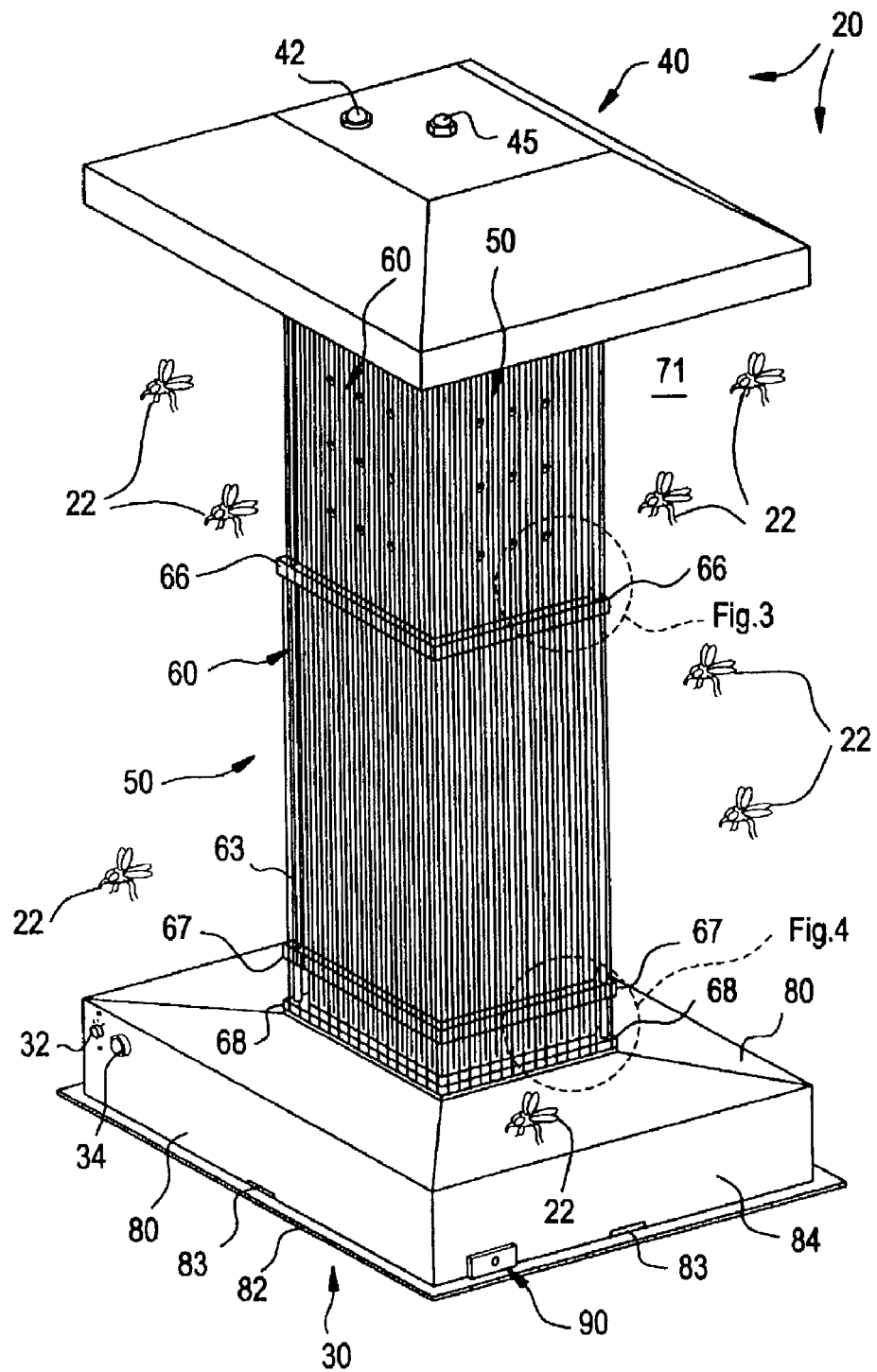
FIG. 2 is an isometric view similar to FIG. 1, but without safety guard 70.

System 20 comprises an elongated, generally parallelepiped housing 25 disposed upon a convenient supporting surface 26 (FIG. 1). The housing comprises a rectangular support base 30 and a spaced apart, truncated pyramidal roof 40 (FIGS. 1-2). The roof closes the tower interior. A switch 32 and photoelectric sensor system 34 control system operation, as discussed hereinafter. A pilot light 42 physically protrudes form roof 40 to indicate the operational status of system 20.

The roof 40 is secured to an internal heating tower 50 extending between the base 30 and the roof 40. A conventional bolt 45 extends through roof 40 to mate with a conventional nut 40. A cross member 48 secures roof 40 to tower 50 and base 30.

The tower 50 conducts air drawn into the base 30 into the upper portion of the housing and then forcefully projects it outwardly. A vertically oriented electrocution grid 60 is fixed to the outer perimeter of the tower 50. An outermost, safety wire mesh guard 70 surrounds the tower. It extends between the base and the roof to prevent accidental contact with the interior electrocution grid 60 or other internal components. An annular region 71 is defined between the guard 70 and tower 50; this region is traversed by mosquitoes 22, 22A (FIG. 1) passing through the guard. Several spaced apart terminal loops 72 and conventional screws 74 removably secure guard 70 to the base 30 and roof 40. The wire mesh comprises several vertically aligned, parallel, spaced apart stringers 76 reinforced by several parallel, regularly spaced apart horizontal cross members 78.

The base 30 preferably comprises a hollow, parallelepiped casing 80 (FIGS. 2, 7-8) that supports the housing 35. The casing 80 rests on plate 82. Casing 80 is penetrated by a plurality of intake orifices 83 for first admitting air into the system in response to fan suction. These preferably slit-shaped orifices 83 are regularly spaced about the casing periphery 84 for admitting air into the system. One slit 83 exposes a moist wick 85 to the exterior of the device. A scent drawer 90 also penetrates casing 80.

The scent drawer 90 contains gel 92 that simulates common smells attractive to mosquitoes or to the target insect. The gel 92 gradually releases pheromones (represented by dashed lines 98) into the casing interior 86 for mixture with the entering air currents (represented by dotted lines 108). Wick 85 supplies moisture (represented by dotted and dashed lines 88) to the casing interior, where it is mixed with the entering air currents 108. Casing interior 86 serves as a mixing chamber where the entering air 108 is intermixed with aromatics 98 and moisture 88.

An internal fan 100 forcefully draws air 108 through the slits 83 and into the casing 80. Preferably, the fan 100 has a relatively low volumetric output rate, in the range of ten to twenty cubic feet per minute (cfm), most preferably fifteen cfm. As air 108 is suctioned into the apparatus it is turbulently mixed with released aromatics 98 and emitted moisture 88 in the casing interior 86. Fan 100 is secured to plate 82 adjacent transformer 102. Preferably, the fan blades 105 are positioned immediately adjacent the tower bottom 58. Air forced upwardly by the fan is directly forced into the heating tower 50 and eventually rises to top 54. The resultant tower air stream is represented generally by arrows 118 (FIG. 8).

The tower 50 preferably comprises an elongated tubular conduit 110, preferably with a rectangular cross-section. The external surface 112 of the conduit 110 is obscured by electrocution grid 60. A plurality of spaced apart braces 64, 65, 66, 67 and 68 secure the electrocution grid to two elongated, vertically oriented parallel rods 62 and 63 that are parallel to the longitudinal axis of opposite tower corners 52 and 53. Of course, tower 50 could be cylindrical or another configuration as long as vertical air flow through tower 50 remains.

An internal, perforated baffle 115 divides the tower 50 into adjacent, lower and upper tubular sections 120 and 130 respectively (FIG. 8). Tower section 120 defines an enclosed heating chamber 125. The upper tower section 130 defines an adjacent dispersal chamber 135. In effect the baffle 115 comprises a restrictor plate between the chambers that affects the internal tower airflow 118. It establishes an internal pressure differential between the chambers. Because of the preferred baffle design, denser, warmer air in the lower chamber is at a higher pressure than air above. The tower air pressure differential, and the temperature and pressure gradients established with the preferred construction I have detailed are important. These synergistically enhance the ability of the system to emulate the infrared signature of a live, breathing animal that is attractive to insects. In other words, I have found that this arrangement produces infrared images that simulate the presence of breathing animals, including human beings, fowl and the like.

The lower tower section 120 houses an elongated, cylindrical, resistive electric heater 122 that warms air within the heating chamber. Baffle 115 restricts the upward airflow to ensure that the residence time of the air 118 in the lower section 120 is adequate to heat the air sufficiently (preferably to a temperature between 100 and 120 degrees Fahrenheit). Preferably, heater 122 centrally extends along the longitudinal axis of section 120 between bottom 58 baffle 115. Heater 122 is supported at one end by a strut 124 extending across bottom 58 above fan 100. The opposite end of heater 122 is supported by brace 115.

This turbulent air 118 is heated as it travels past heater 122. A thermostat 126 controls the operation of heater 122 by monitoring tower temperature. Thermostat 126 is preferably mounted adjacent baffle 115 with its thermostatic element in thermal contact with the tower. Of course, the extent to which the air is heated depends upon prevalent external environmental conditions, as will be discussed more thoroughly hereinafter.

Baffle 115 increases the internal tower pressure differential. As air 118 flows up conduit 110, baffle 115 restricts its flow. Several holes 116 penetrate the plate 117 comprising baffle 115. These holes 116 permit air 118 to eventually cross into top section 130. Consequently, the pressure of the air (indicated by arrows 128) entering the upper section 130 is increased by the restriction of baffle 115. Thus, heated air 128 both a higher temperature and a higher pressure than entering air 108.

Air 128 entering the upper section 130 is eventually dispersed into housing 25 and the immediately surrounding area. As air 128 enters the upper section 130 from the bottom section 120, it flows through a plurality of regularly spaced apart discharge orifices 132 penetrating the upper section walls 134, 135, 136 and 137 beneath the roof. The discharge orifices pass heated, slightly pressured air outwardly in small turbulent streams (as indicated by arrows 138). The air streams 138 emitted from the orifices into the housing are strongest within the interior annulus 71. The multitude of air streams established thereby create the appearance of animal breathing. In addition there are thermal and pressure gradients surrounding the housing 25. These gradients additionally simulate human breathing, and the resultant thermal pattern attracts mosquitoes who mistake it for the infrared signature of an animal, including a human being, fowl or the like.

Figure 3:
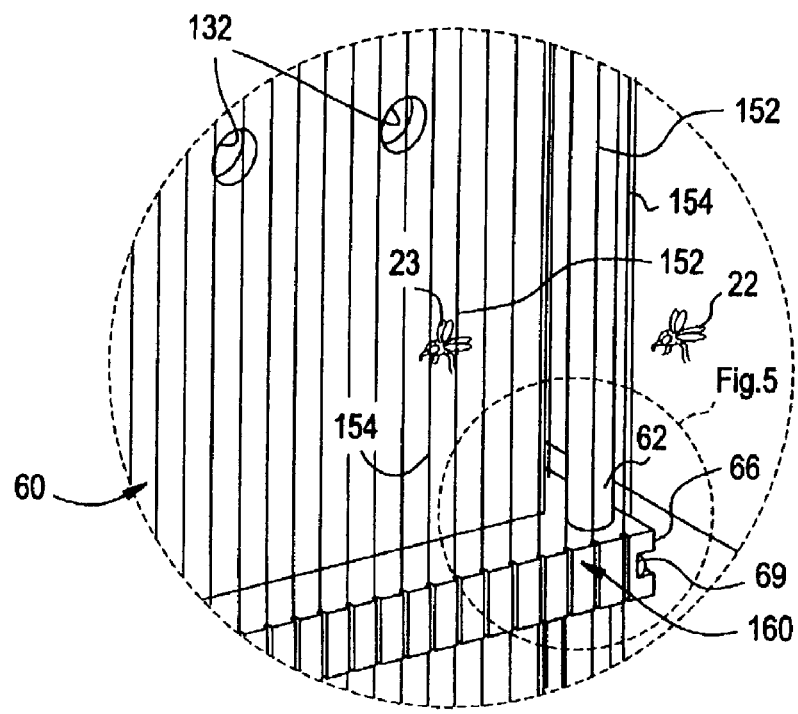
FIG. 3 is an enlarged view of the upper circled area of FIG. 2.
Figure 4:
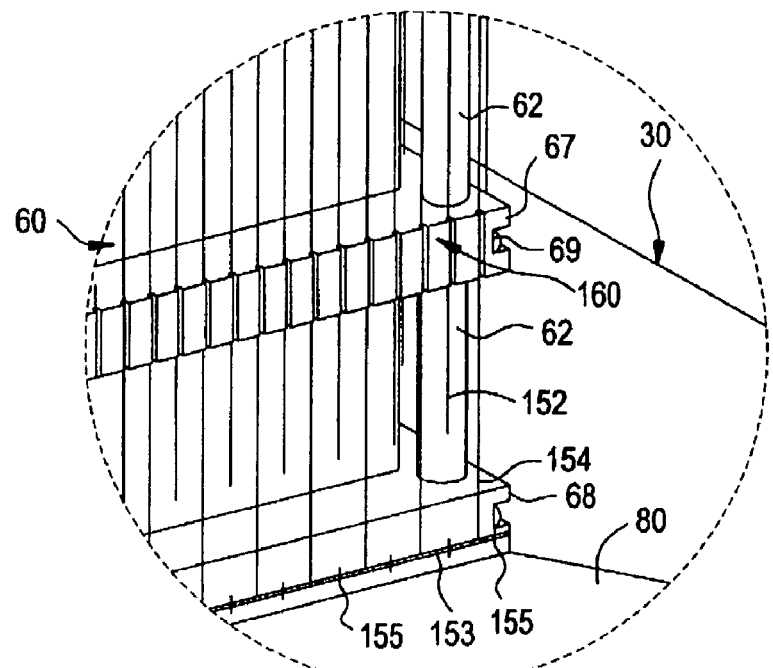
FIG. 4 is an enlarged view of the lower circled area of FIG. 2.
Figure 5:
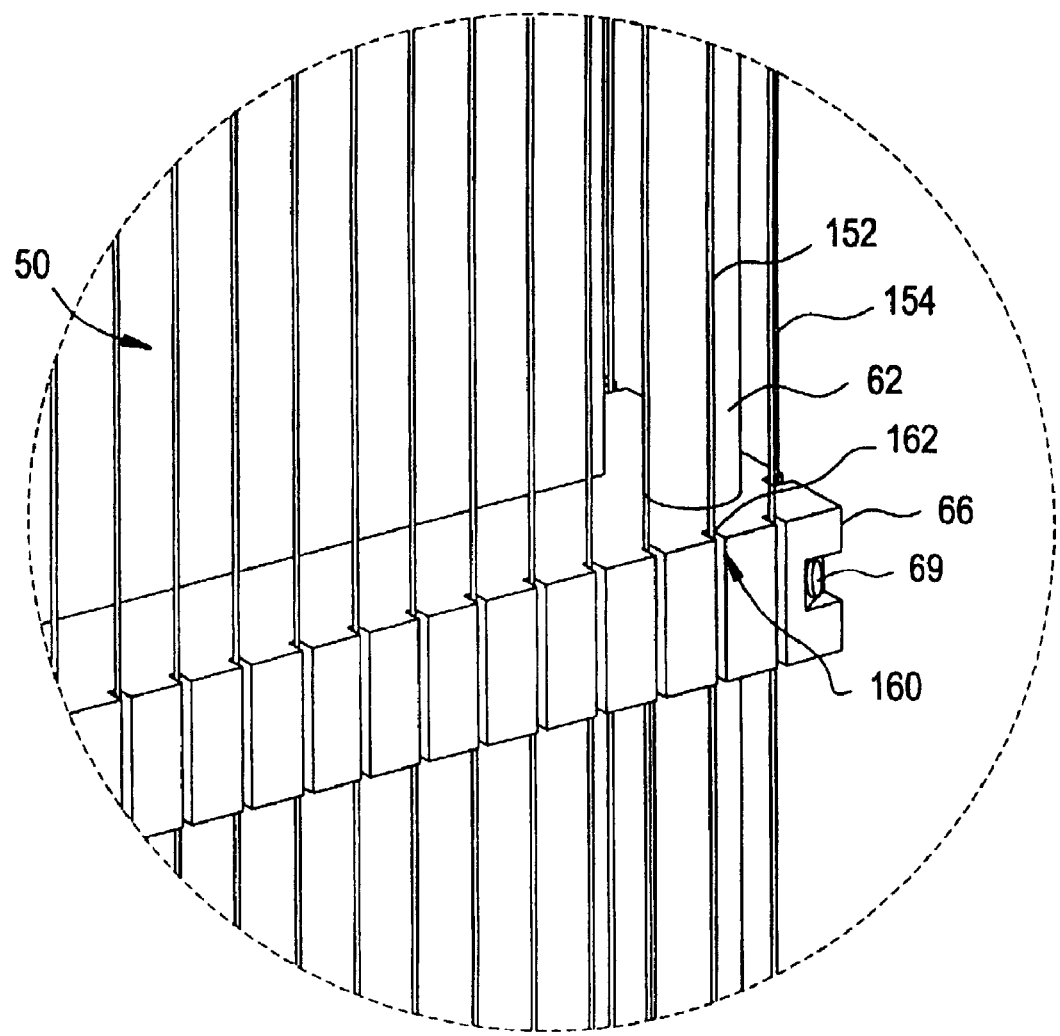
FIG. 5 is an enlarged view of the circled area of FIG. 3.

Attracted mosquitoes 22 are electrocuted (i.e., mosquito 23 shown in FIG. 3) when they approach the tower 50 by the electrocution grid 60 surrounding the exterior conduit surface 112. The electrocution grid 60 comprises a vertically oriented wire network 150. Multiple spaced apart electrically conductive stringers 152 extend downwardly from top brace 64 and main line 151 with corresponding spaced apart electrically conductive stringers 154 protruding upwardly from bottom braces 68 (FIGS. 4 and 7A). A plurality of staples 155 secure both main lines 151, 153 to respective braces 64 and 68.

The downwardly oriented and upwardly oriented stringers 152 and 154 alternate. In other words, an upward stringer 154 extends between each downward stringer 152 (FIG. 7A). Whenever an object touches a downward and an upward stringer 152 and 154, it creates a short circuit that electrifies the object, such as mosquito 23.

Figure 6:
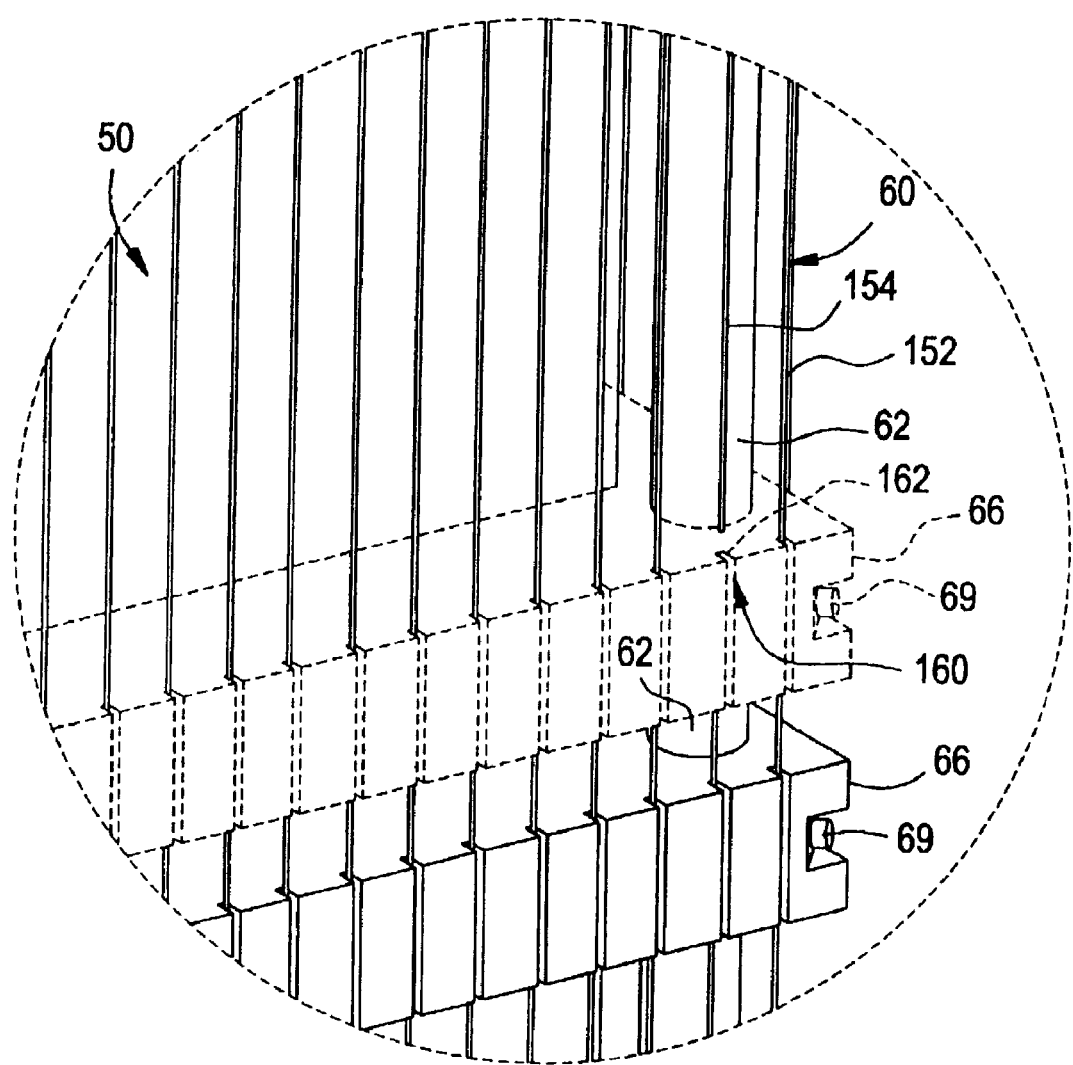
FIG. 6 is an enlarged, partially phantom view similar to FIG. 5, illustrating movement of brace 66 by loosening set screw 69.

After electrocution, the insects (i.e. mosquitoes) are generally disintegrated. Other remains generally fall toward the base 80 where they are typically swept away by winds, etc. However, when necessary, the middle braces 65, 66 and 67 may all be manually manipulated to clean the grid 60. A set screw 69 normally retains the braces in place. Set screw 69 tightens against rod 62 or 63 to secure the brace 64-68. Set screw 69 may be loosened to move braces 65, 66 or 67 upwardly or downwardly to clean stringers 152 and 154 as shown in FIG. 6. A groove 160 extending through braces 65, 66 and 67 receives the stringers 152 and 154. The stingers 152 and 154 slide along the grooves 160 with lip 162 removing any debris thereon.

Figure 9:
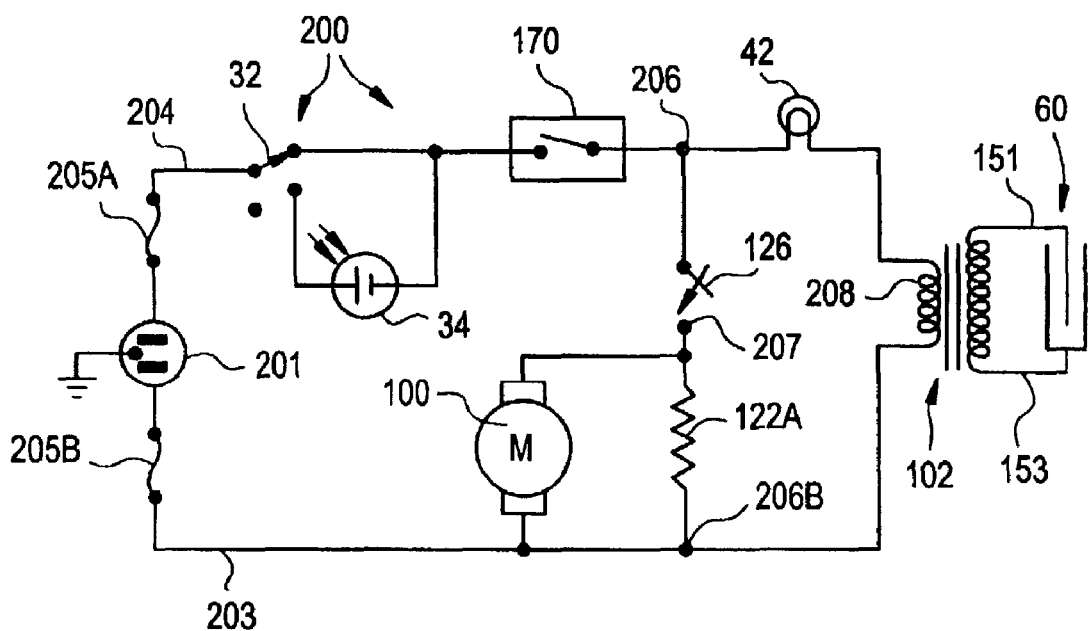
FIG. 9 is a schematic diagram of the electrical circuitry according to an embodiment of the invention.

With primary emphasis now directed to FIG. 9, the preferred electrical control circuit has been designated by the reference numeral 200. Nominally 120 volt A.C. voltage is supplied to the circuitry with a standard three-prong plug 201. Voltage is transmitted across input lines 203, 204 through fuses 205A and 205B. Switch 32 may be user selected to apply power directly to tilt-over safety switch 170. Alternatively, switch 32 may direct voltage via photoelectric switch system 34 to switch 170 or it may be switched "off". System 34 automatically energizes and controls the apparatus depending upon ambient light conditions. Safety tilt-over switch 170 disables the apparatus when the tower is tipped over approximately thirty degrees from vertical.

Voltage applied to node 206 is applied to a thermostat-controlled switch 126. Switch 126 applies voltage to node 207 to energize both motor 100 and resistive heating element 122A. Voltage on node 206 also energizes the primary 208 of high-voltage transformer 102. As long as there is voltage across nodes 206, 206B the pilot light 42 will be energized as well. High voltage outputted from the transformer across lines 151 and 153 electrifies the electrocution grid 60 previously discussed.

For best results the device should be operated during the night. It should be placed away from humans. During daylight hours it is preferably placed in the shade. During operation system 20 attracts mosquitoes 22 by projecting air 138 outwardly from tower 50. Air 138 comprises a mixture of moisture 88, aromatics 98 and heated and pressurized air 128. The projected air 138 creates several thermal and pressure gradients around housing 25 that simulate human breathing and body heat. The aromatics 98 and moisture 88 further enhance the simulation of a live animal such as a human or fowl.

The system 20 first draws air 108 into base 30 through several slits 83 as a result of the operation of a fan 100. Of course switch 32 must be activated. As air 108 enters the casing interior 86, it mixes with aromatics 98 escaping from drawer 90 and moisture 88 from wick 85. The mixed air is then blown upwardly into heating tower 50.

As the blown air 118 enters the tower section 120, it passes an electric heater 122. Heater 122 warms air 118 to a preselected temperature as determined by thermostat 126. The heated air 118 is also slightly pressurized by baffle 115 as it moves into dispersal chamber 130.

Air 128 moving into chamber 130 is projected outwardly through several orifices 132. As air leaves chamber 130, it begins cooling and depressurizing as it moves outwardly. Cooled and depressurized air 138 establishes multiple thermal and pressure gradients once outside tower 50. Even more thermal and pressure gradients are created once air 138 leaves housing 25.

The multiple gradients attract mosquitoes 22. As attracted mosquitoes 22 enter housing 25 through guard 70, they alight upon grid 60 where they are subsequently disintegrated (i.e. Mosquito 23). Since system 20 attracts mosquitoes without ultraviolet light, beneficial insects and other insects are not attracted to system 20. In other words, since system 20 uses the infrared spectrum to attract target insects such as mosquitoes, the system 20 does not attract large numbers of non-target insects.

Experience dictates that the air 138 passing guard 70 should approximate 100 degrees Fahrenheit. In other words, on windy or cold days, the thermostat 126 should run heater 122 longer than warm, hot days.

Figure 10:
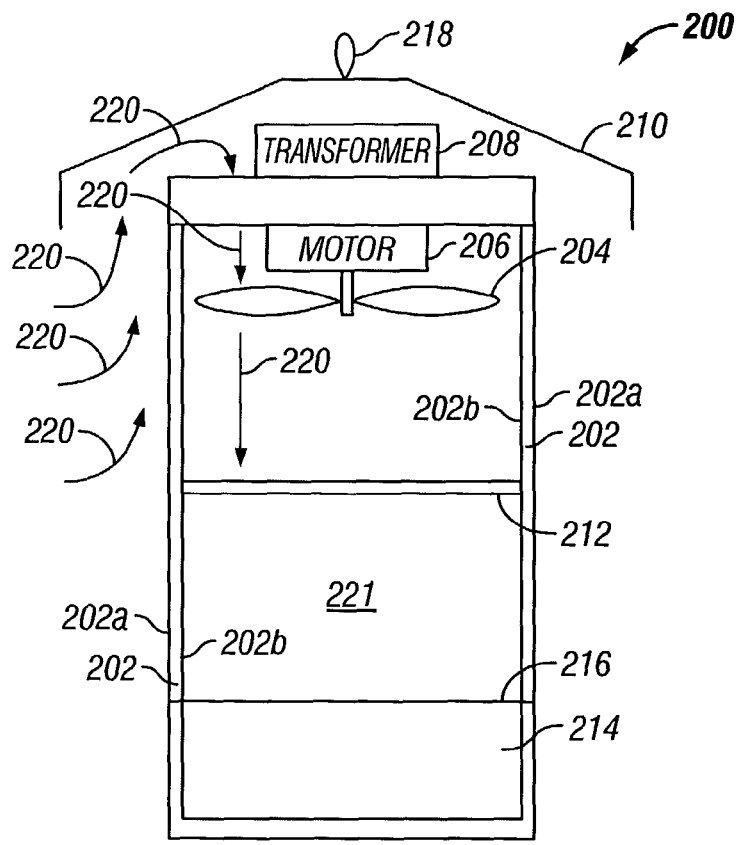
FIG. 10 is a partial cross-sectional view of a mosquito killing apparatus according to an embodiment of the invention.

FIG. 10 shows a second preferred embodiment of the invention. According to this embodiment, apparatus 200 provides a heated air space 202 between outer wall 202a and inner wall 202b of the main body of the apparatus 200. Space 202 may reheated by any appropriate mechanism such as a heating tube, resistive conductors, or equivalent heat producing mechanisms, such as heater 122 as shown in FIGS. 7 and 8. The heated space 202 creates a heat blanket or gradient around the periphery of the apparatus, which attracts mosquitoes to the outer surface 202a. A fan 204 driven by a motor 206 causes the air flow in the direction of arrows 220, from the vicinity of outer surface 202a and down into interior chamber 221 of the apparatus 200 thorough an opening between a canopy 210 and the top of the main body of the apparatus 200.

An electrocution grid 212 is provided in the interior chamber 221. Mosquitoes are attracted to the surface 202a by the surrounding heat and are sucked into the apparatus by air currents 220, where they are forced down onto the grid 212 and electrocuted. Mosquito remains then fall into a removable trap 214, which is removed from the bottom of the apparatus 200 for disposal. A wire mesh 216 covers the bottom of the apparatus to prevent access to the interior.

The embodiment of FIG. 10 provides a measure of safety by placing the electrocution grid inside the body of the apparatus, precluding inadvertent contact by humans. The electrocution grid is mounted horizontally so that mosquito remains fall into trap 24 through the force of gravity, eliminating the need to periodically clean the electrocution grid.

Figure 11:
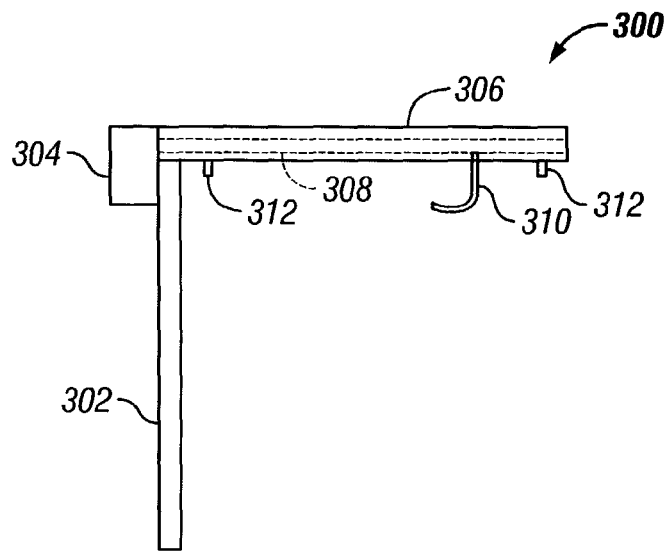
FIG. 11 is a partially broken view of a motion pole used in conjunction with the embodiment of FIG. 10.

FIG. 11 shows a motion pole 300 for use with a mosquito killing apparatus according to the embodiments of the invention, and in particular with the embodiment of FIG. 10. Motion pole 300 includes a vertical arm 302 for placement in the ground or mounting on a floor, and a horizontal arm 306. Arm 306 contains a track in which an auger screw 308 is installed. Screw 308 is coupled to a motor 304 for rotating the screw 308. A hook 310 is connected to the auger screw and is moved along the length of arm 306 as the screw is rotated by the motor. A pair of limit switches 312 are provided near the ends of arm 306 and function to reverse the direction of the motor when they are activated by coming into contact with hook 310. A suitable attachment mechanism such as loop 218 is provided on the apparatus 200 for engagement with the hook 310. Alternatively, hook 310 may be inserted into an eyelet provided in the top of the apparatus 200.

In operation, the apparatus 200 slowly transverses the path between the limit switches 312 on the horizontal arm 306, simulating motion of a living animal, which provides an attractant to mosquitoes in the surrounding area.

It is further understood that the foregoing description is of preferred embodiments of the present invention and that various changes and modifications can be made without departing from the spirit and scope thereof. For example, the power supply may be adapted to be battery powered for increased portability to remote areas. Additionally, solar panels may be added to the apparatus to provide solar power which could be stored in rechargeable batteries. The heating source may be implemented by a solar hear tube, which absorbs solar heat and releases the absorbed heat in a thermostatically regulated fashion to maintain a temperature simulating body temperature of living animals or humans. It is noted further that while various mosquito attractants have been disclosed in the present specification, it is to be understood that not all attractants need to be used together in the same apparatus, and that different attractants as described above may be used in areas where different species of mosquito are present.

I claim:

1. A method of attracting mosquitoes to a mosquito-killing device for electrocution and/or trapping, the method comprising:
    using a heat source other than a light bulb to generate heat within the device such that a heat gradient between an outer surface of the device and the atmosphere surrounding the device is created thereby emulating emission of body heat by an animal;
    creating an airflow that flows into, through, and out of the device;
    using the heat source to heat the airflow as it flows through the device;
    introducing into the airflow at least one mosquito attractant other than heat; and
    creating an airflow that sucks mosquitoes, which have been attracted to the outside of the device, into the device for electrocution and/or trapping by the device.

2. The method of attracting mosquitoes of claim 1, wherein the at least one attractant includes an aromatic.

3. The method of attracting mosquitoes of claim 1, wherein the at least one attractant includes at least one pheromone.

4. The method of attracting mosquitoes of claim 1, wherein the at least one attractant includes moisture.

5. The method of claim 1, wherein using a heat source to generate heat within the device further comprises: using resistive electrical conductors to generate the heat.

6. The method of claim 1, further comprising: directing the airflow through an electrocution grid within the device.

7. The method of claim 6, further comprising: directing the airflow through a trap within the device.

8. The method of claim 1, further comprising: directing the airflow through a trap within the device.

9. The method of claim 1, further comprising: moving at least a portion of the device to simulate motion of a living creature.

10. A method of attracting mosquitoes to a mosquito-killing and/or trapping apparatus, the method comprising:
    using a heat source other than a light bulb to generate heat within the apparatus such that heat is emitted from an outer surface of the apparatus to create a heat gradient for attracting mosquitoes to the outer surface of the apparatus;
    simulating exhaling by an animal by emitting a gaseous flow for attracting mosquitoes to the apparatus, wherein the gaseous flow includes heat and moisture introduced into the gaseous flow inside the apparatus; and
    creating an airflow to suck the attracted mosquitoes into the apparatus for electrocution and/or trapping within the apparatus.

11. The method of claim 10, wherein the gaseous flow includes a pheromone.

12. The method of claim 10, wherein using a heat source other than a light bulb to generate heat within the apparatus such that heat is emitted from an outer surface of the apparatus further comprises: using resistive electrical conductors within the apparatus to generate heat within the apparatus.

13. The method of claim 10, further comprising: directing the airflow through the device.

14. The method of claim 10, further comprising: moving at least a portion of the apparatus to simulate motion of a living creature.

15. Apparatus that attracts mosquitoes to be killed and/or trapped, the apparatus comprising:
    means other than a light bulb for generating heat within the apparatus such that a heat gradient between an outer surface of the apparatus and the atmosphere surrounding the apparatus is created thereby emulating emission of body heat by an animal;
    means for creating an airflow that flows into, through, and out of the apparatus;
    means for using the heat source to heat the airflow as it flows through the apparatus;
    means for introducing into the airflow at least one mosquito attractant other than heat; and
    means for creating an airflow that sucks mosquitoes, which have been attracted to the outside of the apparatus, into the apparatus for electrocution and/or trapping by the apparatus.

16. The apparatus of claim 15, wherein the means for generating heat within the apparatus further comprises: means for using resistive electrical conductors to generate the heat.

17. The apparatus of claim 15, further comprising: means for directing the airflow through an electrocution grid within the apparatus.

18. The apparatus of claim 15, further comprising: means for directing the airflow through a trap within the apparatus.

19. The apparatus of claim 15, further comprising: means for moving at least a portion of the device to simulate motion of a living creature.

20. A method of attracting mosquitoes to a mosquito-killing device, the method comprising:
    using a heat source other than a light bulb to generate heat within the device;
    creating an airflow, for attracting mosquitoes to the device, such that
        air is sucked into the device in a first direction, and
        heated air that includes at least one insect attractant other than heat is emitted from the device in a second direction, which is different than the first direction.

21. The method of attracting mosquitoes of claim 20, wherein the at least one attractant includes an aromatic.

22. The method of attracting mosquitoes of claim 20, wherein the at least one attractant includes a pheromone.

23. The method of attracting mosquitoes of claim 20, wherein the at least one attractant includes moisture.

24. The method of attracting mosquitoes of claim 20, wherein the second direction is substantially opposite of the first direction.

25. The method of claim 20, further comprising: moving at least a portion of the device to simulate motion of a living creature.

26. A mosquito-killing apparatus that attracts mosquitoes, the apparatus comprising:
    means other than a light bulb for generating heat within the apparatus;
    means for creating an airflow, for attracting mosquitoes to the apparatus, such that air is sucked into the apparatus in a first direction, and heated air that includes at least one insect attractant other than heat is emitted from the apparatus in a second direction, which is different than the first direction.

27. The apparatus of claim 26, wherein the at least one attractant includes an aromatic.

28. The apparatus of claim 26, wherein the at least one attractant includes a pheromone.

29. The apparatus of claim 26, wherein the at least one attractant includes moisture.

30. The apparatus of claim 26, wherein the second direction is substantially opposite of the first direction.

31. The apparatus of claim 26, further comprising: means for moving at least a portion of the apparatus to simulate motion of a living creature.

32. The method of attracting mosquitoes of claim 1, wherein using the heat source to heat the airflow as it flows through the device further comprises: controlling how much heat is applied to the airflow such that the airflow flows out of the device at approximately a predetermined temperature to simulate warm breath exhaled by an animal.

33. The method of claim 10, wherein an amount of heat introduced into the gaseous flow inside the apparatus is controlled such that the airflow flows out of the apparatus at approximately a predetermined temperature to simulate warm breath exhaled by an animal.

34. The apparatus of claim 15, wherein the means for using the heat source to heat the airflow as it flows through the apparatus further comprises: means for controlling how much heat is applied to the airflow such that the airflow flows out of the apparatus at approximately a predetermined temperature to simulate warm breath exhaled by an animal.

35. The method of claim 20, wherein a temperature of the heated air that is emitted from the device is controlled so that the heated air is emitted at approximately a predetermined temperature to simulate warm breath exhaled by an animal.

36. The apparatus of claim 26, wherein a temperature of the heated air that is emitted from the apparatus is controlled so that the heated air is emitted at approximately a predetermined temperature to simulate warm breath exhaled by an animal.

\* \* \* \* \*

UNITED STATES PATENT AND TRADEMARK OFFICE
CERTIFICATE OF CORRECTION

| | | |
|---|---|---|
| PATENT NO. | : 7,832,140 B2 | Page 1 of 1 |
| APPLICATION NO. | : 10/445584 | |
| DATED | : November 16, 2010 | |
| INVENTOR(S) | : Alvin D. Wilbanks | |

It is certified that error appears in the above-identified patent and that said Letters Patent is hereby corrected as shown below:

Title Page, Item (76) Inventor should read as follows:

--(76) Inventor:    Alvin D. Wilbanks
                            2162 Doss Road
                            Mexico, MO (US) 65265--

Signed and Sealed this
Twenty-fifth Day of January, 2011

David J. Kappos
*Director of the United States Patent and Trademark Office*